United States Patent [19]

Albosta et al.

[11] Patent Number: 4,908,638

[45] Date of Patent: Mar. 13, 1990

[54] INK JET MARKING HEAD HAVING MULTICOLOR CAPABILITY

[75] Inventors: Chester A. Albosta, Foster City; Suresh C. Paranjpe, Fremont, both of Calif.

[73] Assignee: Xerox Corporation, Stamford, Conn.

[21] Appl. No.: 285,133

[22] Filed: Dec. 15, 1988

[51] Int. Cl.[4] .............................................. G01D 15/18

[52] U.S. Cl. .................................... 346/140 R; 346/75

[58] Field of Search ........................... 346/140 PD, 75

[56] References Cited

U.S. PATENT DOCUMENTS 4,774,529 9/1988 Paranjpe et al. ............. 346/140 PD 4,800,403 1/1989 Accattino et al. ........... 346/140 PD

FOREIGN PATENT DOCUMENTS 57-87370 5/1982 Japan ............................ 346/140 PD

*Primary Examiner*—George H. Miller, Jr.

*Attorney, Agent, or Firm*—Serge Abend

[57] ABSTRACT

An ink jet printer having a marking head, a number of ink supply containers, and conduit means interconnects the marking head with the ink supply containers. Selector means is associated with the marking head for receiving ink from the conduit means and being repositionable for allowing one of the color inks to pass therethrough to the ink ejecting orifices.

8 Claims, 6 Drawing Sheets

INK JET MARKING HEAD HAVING MULTICOLOR CAPABILITY

FIELD OF THE INVENTION

This invention relates to an ink jet marking device having plural ink supply lines delivering ink to a diverting valve associated with a marking head for enabling the marking head to project one of plural color inks. The marking device may be either of the scanning head type or of the line width type.

BACKGROUND OF THE INVENTION

Non-impact recording methods in the form of ink jet printing, thermal transfer printing and dye diffusion thermal transfer printing are presently of considerable interest because they are all capable of achieving high print speeds while operating relatively quietly and readily may produce full color, highlight color and monochrome records. The present invention is directed to the supplying of different color inks to one or more scanning recording heads in an ink jet printing device. This flexibility will enable multiple mono-color printing and highlight color printing, in addition to process color printing switchable to high speed monocolor printing, as will be described.

In one form of the ink jet recording process, droplets of ink are selectively expelled from an ink filled channel onto a spaced recording substrate. This process is often referred to as drop-on-demand. Propulsion may be accomplished by any one of several known methods for imparting pressure increases to confined portions of the ink adjacent to the ejection orifice. Examples of such pressure inducing devices are piezoelectric elements, acoustic generators, magnetic compressors or thermal elements.

Thermal, drop-on-demand ink jet printing systems make use of a thermal energy pulse of predetermined profile to produce a vapor bubble in an ink filled channel for expelling ink droplets from the channel orifice. A thermal energy generator, usually a resistor, is located in the channel a predetermined distance from the orifice. A resistor is associated with each nozzle, and each is individually addressed with a current pulse to rapidly heat and vaporize the ink. As the bubble grows, the ink bulges from the orifice and is contained by the surface tension of the ink as a meniscus. When the thermal energy is no longer applied, the bubble begins to collapse, causing the ink still in the channel, between the orifice and the bubble, to move toward the collapsing bubble. The volumetric contraction of the ink at the orifice results in the separation of the bulging ink as a droplet. The acceleration of the ink out of the orifice while the bubble is still growing provides the momentum and velocity of the droplet in a substantially straight line direction towards a recording medium, such as a paper sheet. Simultaneously with the ejection, a negative pressure condition is created within the channel causing ink to be drawn from a supply source into the channel, for filling it by capillary action.

This method has gained rapidly in popularity because it is possible to fabricate the channels and their bubble forming heaters simply and inexpensively by photolithographic thin film electronics methods. Recording heads including a dense array of channels, each with its thermal driver, may readily be made to a high resolution of 300 spots (orifices), or more, per inch. An ink jet recording head mounted upon a scanning carriage for forward and back traversing of a recording sheet, and having an array of orifices arranged normal to the scan direction, may "write" a scan line of information of 50 spots in a swath 1/6 inch wide. Koumura et al in U.S. Pat. No. 4,528,576 disclose several ink jet printer configurations including multiple scanning recording heads. In one form, the marking heads, on a scanning carriage, are aligned in the paper feed direction to enable simultaneous multicolor printing of recording segments with colored inks of black, cyan, magenta and yellow (B, C, M, Y) as the heads are moved forward and back relative to the recording sheet. In another arrangement, there is disclosed several marking heads disposed side-by-side upon a scanning carriage for projecting recording segments of colored inks in sequential scanning carriage passes.

In U.S. Pat. No. 4,774,529 (Paranjpe et al), assigned to the same assignee as the instant application, there is disclosed another form of a scanning recording head for an ink jet printer which is convertible from a multicolor printing mode to a higher speed monochrome printing mode. Several recording heads, for marking with colored inks of black, cyan, magenta and yellow, are aligned side-by-side in the scanning direction. When it is desired to print with a single color, usually black, one of the replaceable head cartridges is repositioned from a first level to a second level, so as to enable "writing" of at least two lines of information during a single scanning pass. Two lines may be printed simultaneously, thereby increasing the printing speed twofold. The printer disclosed in that patent is convertible from a multicolor mode to a higher speed monochrome mode, but since it requires the physical vertical displacement of an ink cartridge, accurate alignment of the shifted ink cartridge, sufficient to prevent relative positioning errors between the displaced arrays, is difficult to accomplish.

Alternatively, it is well known, as shown in U.S. Pat. No. 4,492,966, to mark with a line printer having orifices which extend in a direction substantially normal to the receptor sheet transport direction. These marking devices usually include one or more stationary marking heads extending the full width of the recording sheet.

It is an object of the present invention to increase the flexibility of operation of an ink jet marking head by providing a multicolor ink delivery system thereto and source selection means therefor.

It is a further object of this invention to provide a plural marking head printing mechanism which is capable of marking with more than one colored ink per head.

It is yet another object of this invention to provide an array of recording heads mounted upon a scanning carriage which may be operated in either a multicolor mode or a high speed monochrome mode.

SUMMARY OF THE INVENTION

These objects may be achieved, in one form, by providing an ink jet marking device for marking upon a receptor sheet movable in a transport direction, comprising a marking head having an array of ink ejecting orifices. A number of ink supply containers is provided at a location remote from the marking head and conduit means interconnects the marking head with the ink supply containers. Selector means is associated with the marking head for receiving ink from the conduit means and being repositionable for allowing one of the color inks to pass therethrough to the ink ejecting orifices.

BRIEF DESCRIPTION OF THE DRAWINGS

Other objects and further features and advantages of this invention will be apparent from the following, more particular, description considered together with the accompanying drawing wherein.

DETAILED DESCRIPTION OF THE INVENTION

Figure 1:
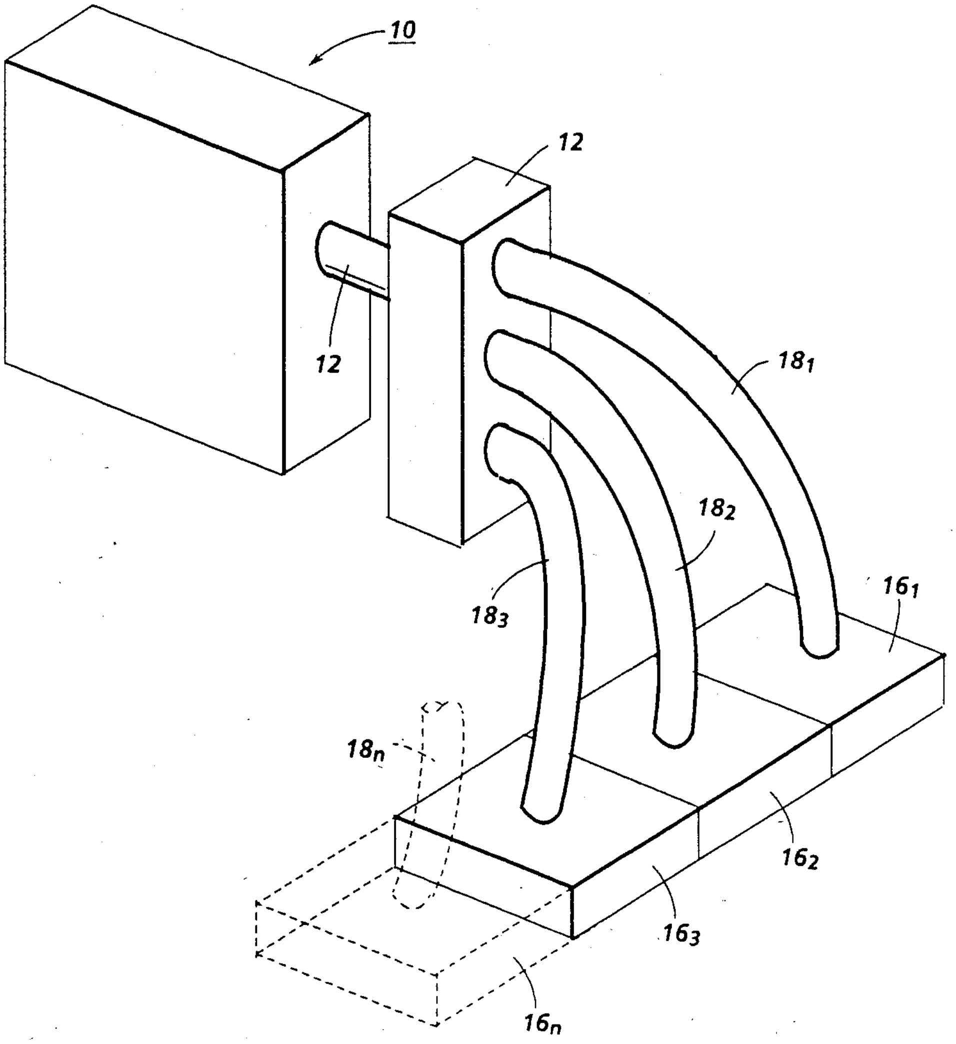
FIG. 1 is a perspective view schematically showing a single marking head in accordance with the present invention.

Recording heads have normally been dedicated to a single color ink, either by being integral with a recording head cartridge which carries its own ink supply, or by being connected to a dedicated ink supply container. In the device of our invention we provide a recording head with plural ink supply lines and an associated selector mechanism. In FIG. 1 there is shown an ink jet marking head 10 to which ink is delivered via conduit 12 from an n-way selector mechanism 14. A number of ink supply containers $16_1$, $16_2$, $16_3$ . . . $16_n$, each housing a different color ink, deliver ink to the selector mechanism via ink supply conduits $18_1$, $18_2$, $18_3$ . . . $18_n$. Of course, the selector mechanism may include any suitable valving construction for switching two, three, four or n inks.

Figure 2:
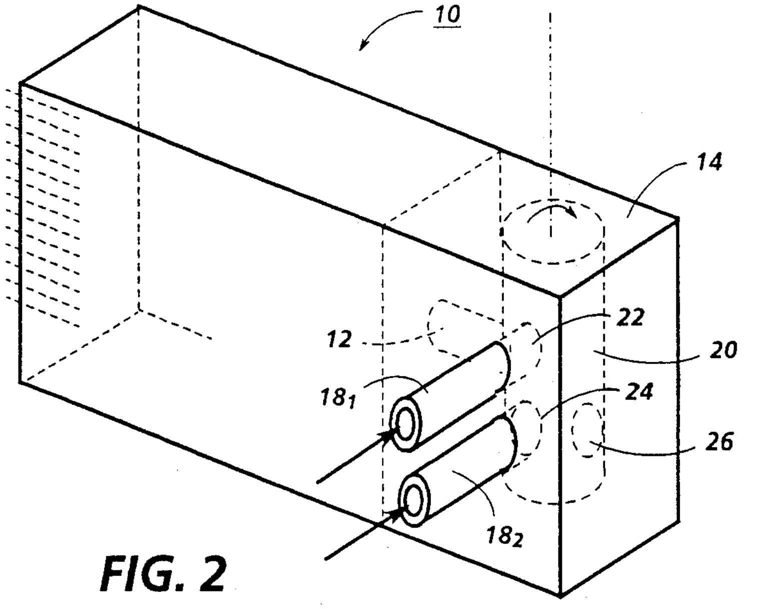
FIG. 2 is a perspective view showing the details of one form of an ink diverting mechanism.

In FIG. 2 the marking head 10 and one form of a two-way selector mechanism are illustrated as being integral with ink being supplied by two supply conduits $18_1$ and $18_2$. It is highly desirable to locate the selector mechanism as close to the orifice array as possible so as to minimize the amount of lost ink when color switching is effected. The selector mechanism 14 includes a rotary diverting valve 20, a pair of internal supply ports 22 and 24 communicating the valve with the flexible supply conduits $18_1$ and $18_2$, respectively, and an internal port 12 for delivering the selected ink from the diverting valve to a collecting chamber within the recording head. The diverting valve has two orifices (only one, identified by the numeral 26, can be seen) therethrough each having one end terminating adjacent to the internal part 12 and the other end terminating adjacent to either internal supply port 22 or 24. The rotary diverting valve may be repositioned in the direction of arrow A by means of a rotary solenoid or motor (not shown). Changing the diverting valve position allows the marking head array to receive ink from one color supply container or another. The versatility of practicing our invention in this configuration should be readily apparent. The single scanning head is capable of being selectively operated with any one of several colors of ink delivered to it. In another useful mode, for two-color printing, the marking head would be used primarily with a single color, e.g. black, and could be switchable to one or more highlight colors, as needed.

Figure 3:
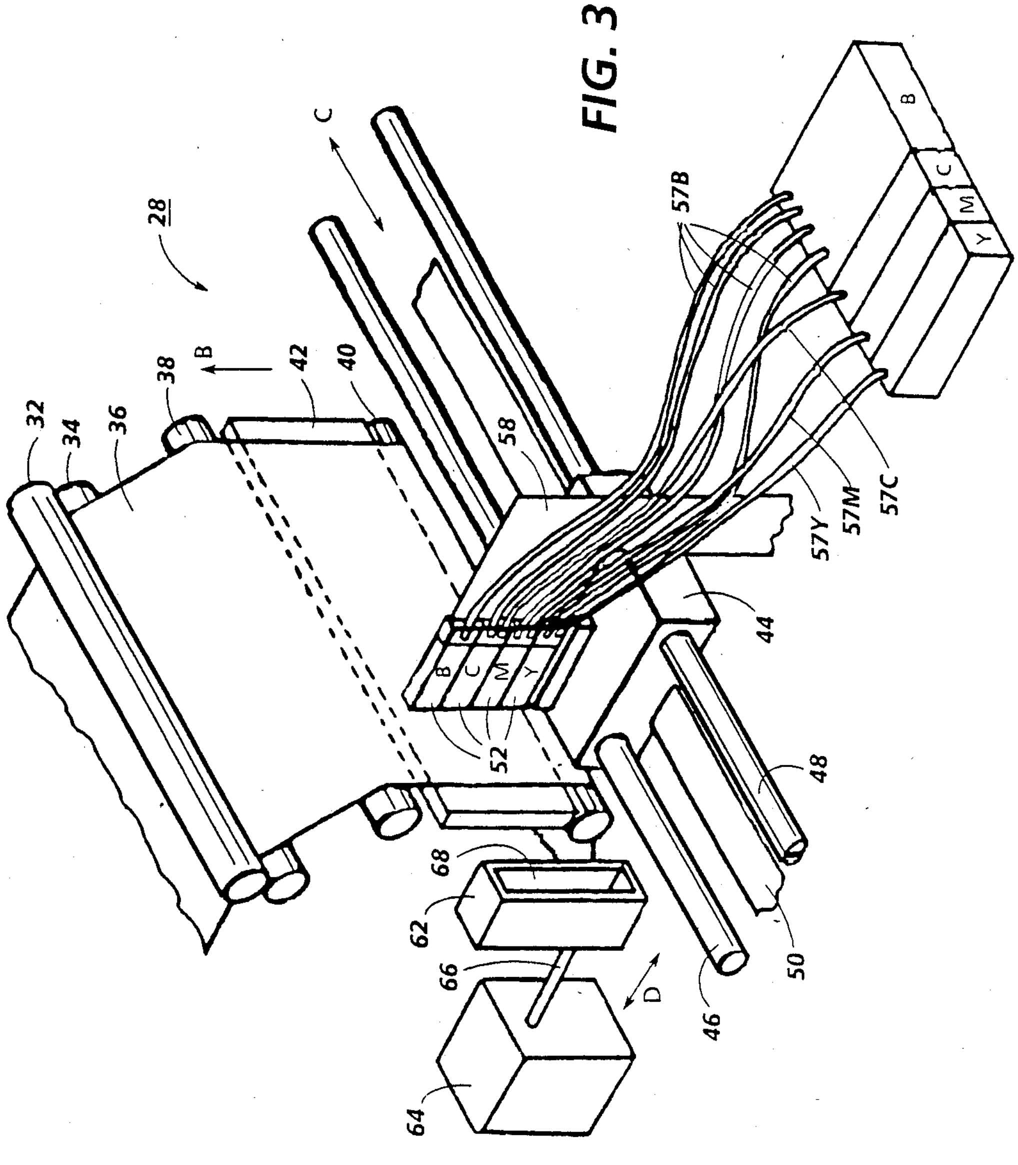
FIG. 3 is a perspective view showing plural vertically aligned scanning marking heads convertible from a multicolor marking to a high speed monochrome capability.

Turning now to FIG. 3, we have shown a plural marking head scanning ink jet printer constructed for operation in a first, multicolor (process color), multipass mode wherein each of the heads marks with a different color ink and switchable to operation in a second, monochrome, single pass mode, wherein all of the heads mark with the same color ink and high speed printing may be achieved. The printer 28 includes a sheet feed transport mechanism 30 comprising a pair of drive rollers 32 and 34 for drawing an image receptor sheet 36 over a pair of guide rollers 38 and 40 which define a recording zone adjacent to platen 42. The sheet is moved incrementally past the recording zone in a transport direction, indicated by arrow B. A scanning carriage 44 is mounted for reciprocation in the direction of arrow C (normal to direction of arrow B) upon guide rails 46 and 48 secured to the frame. Movement of the carriage forward and backward upon the guide rails, past the recording zone, may be accomplished by any suitable mechanism such as a cable drive arrangement, a screw drive, or by the toothed drive belt 50 driven by a drive motor (not shown).

A number of recording beads 52B, 52C, 52M and 52Y are mounted upon the carriage 44 for movement therewith. Each head includes an array of internal channels, each coupled with a resistance heater and terminating in an orifice through which drops of ink may be expelled in response to a drive signal. The arrays are generally vertically aligned with one another and extend parallel to the transport direction B. Ink supplies are stored in containers 54B, 54C, 54M and 54Y, within the printer, at a location remote from the movable carriage 44 so as to be readily accessible to the operator for replacement, and positioned such that its hydraulic head is appropriate for ink delivery. A flexible supply conduit 56B extends from the container 54B to each of the four recording heads 52. A single flexible supply conduit 57C, 57M and 57Y extends from each of the storage containers 54C, 54M and 54Y to its respective recording head 52C, 52M and 52Y. A flexible wiring harness 58 is secured to the recording head array for coupling the resistance heaters (within the recording head) with suitable drive electronics, conventionally mounted upon a mother board within the base of the printer.

At one end of the printer, outboard of the printing zone (shown at the left end of FIG. 3) there is a maintenance station 60 including a cap member 62 movable toward and away from the recording heads in the direction of arrow D. A suction pump 64 is connected to the cap member 62 via pipe 66 and generates negative pressure in the cavity 68 into which the recording heads fit tightly so that ink may be extracted through the orifices of the arrays. In normal use, the maintenance station primes the recording head after the installation of a new ink supply container 54 by drawing ink from the supply container through the array so as to remove all air from the system. Also, when the primer is not printing, the recording head is "parked" at the maintenance station where it is capped to retard the rate of evaporation of the ink solvent. Upon receiving a signal to being printing, the vacuum pump 64 is turned on to draw some ink to remove old (dried or viscous) ink and air bubbles which may have accumulated. Another normal use for the maintenance station occurs when the operator observes a print quality error attributable to a dirt particle clogging or obstructing one or more orifices. The operator may invoke a purge cycle for the problem array in order to dislodge the foreign matter.

Figure 4:
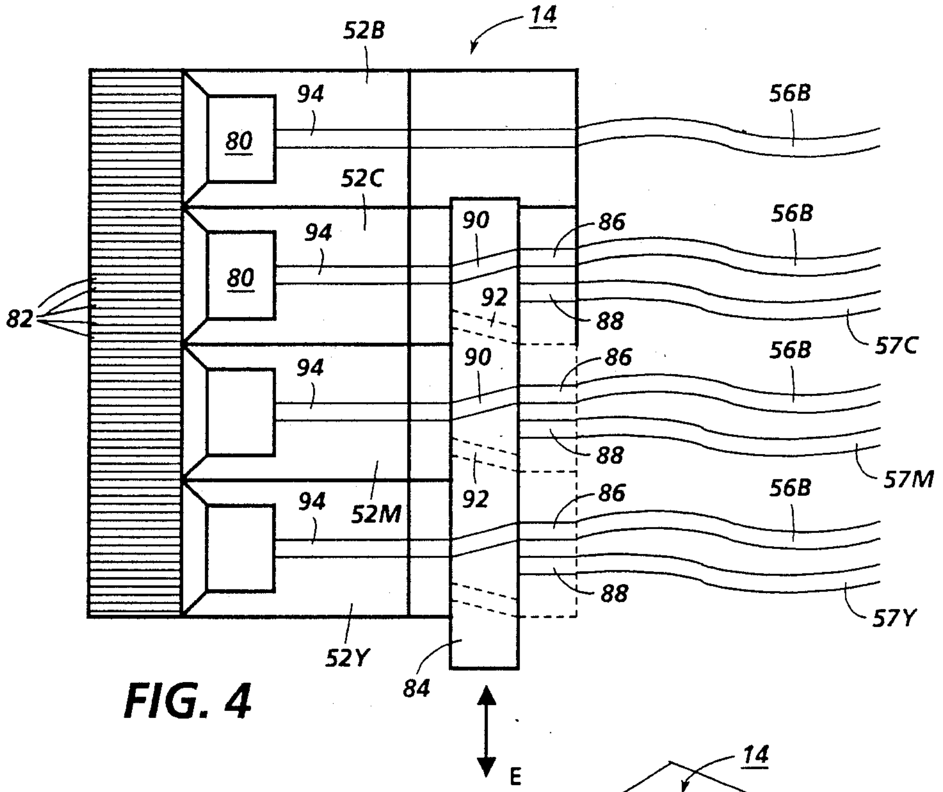
FIG. 4 is a side sectional view showing the vertically aligned marking head arrays of the FIG. 3 embodiment and another form of the ink diverting mechanism.
Figure 5:
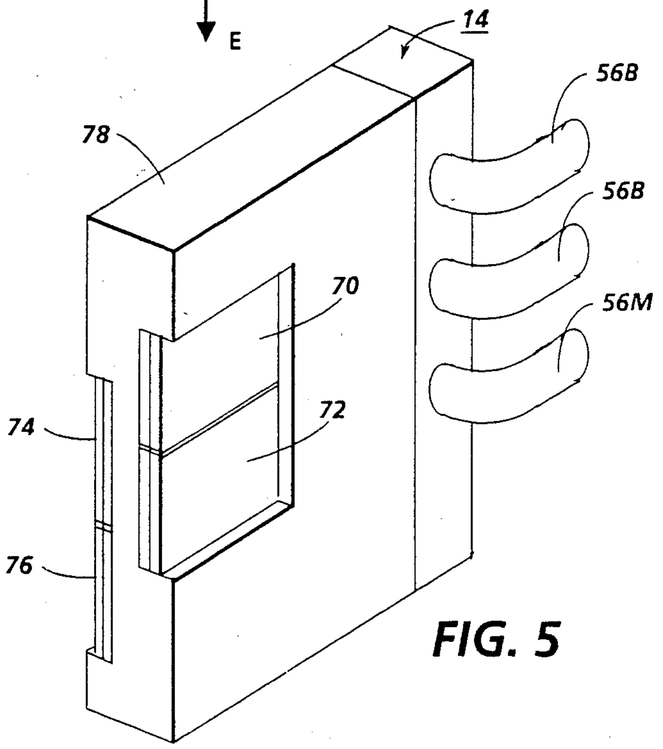
FIG. 5 is a perspective view showing another form of the vertical marking head arrays.

We illustrate two arrangements of vertically aligned recording heads in FIGS. 4 and 5. In FIG. 4 the recording heads about one another so that the end channels of adjacent arrays are spaced from one another by virtually the same distance as the channels within an array. In FIG. 5 the heads are horizontally offset from one another but the same vertical relationship exists between adjacent arrays. The FIG. 5 arrangement provides two recording heads 70/72 and 74/76 mounted upon each side of a heat sink support member 78. The heads are staggered so that the last channel of head 70 and the first channel of 74 are spaced by virtually the same distance as the channels within either head. This relationship also exists with respect to heads 74 and 72, 72 and 76. Since the recording head arrays are laterally offset from one another, suitable changes in the timing of the jet firings will be necessary.

In each of the heads of FIGS. 4 and 5, ink is delivered to collecting chambers 80 from which it is fed to channels 82 to be expelled from orifices at one end of the marking head. Ink is delivered to the selector mechanism 14 at the opposite end of each marking head through supply conduits 56 and 57. A ganged reciprocating diverting valve assembly 84, movable in the direction of arrow E, includes a valve section for each recording head. As the valve assembly is moved from one position to another, either the black ink or the four color inks will be delivered from internal supply ports 86 and 88 through one of valve passages 90 or 92 to the collecting chambers 80 via internal delivery ports 94. It should be noted that the diverter valve may take the form of a rotary valve as shown in FIG. 2 or a reciprocating valve as shown in FIG. 4 and may be either ganged or independently operated.

Figure 6A:
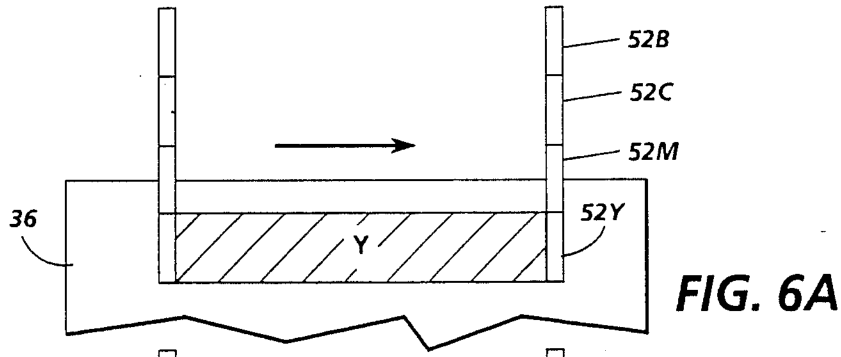
FIGS. 6A-6D illustrates the multicolor marking process effected by the FIG. 3 embodiment.
Figure 6B:
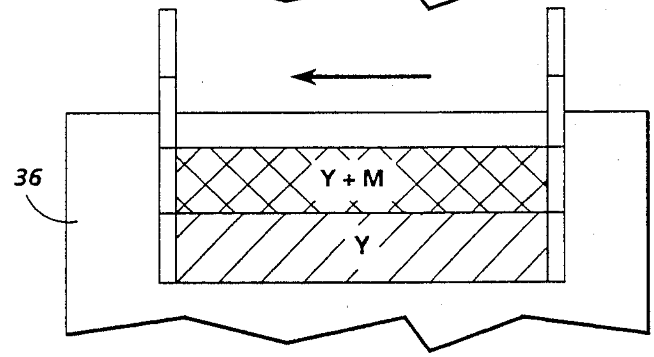
Figure 6C:
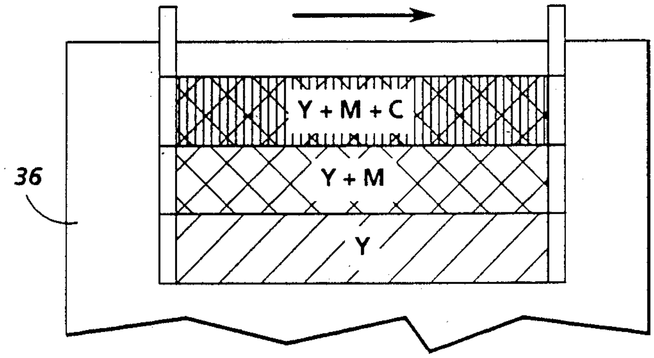
Figure 6D:
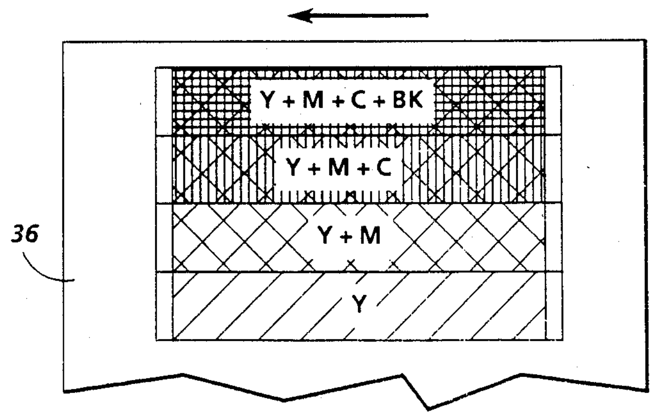

The printer operation in the multicolor mode is shown in FIGS. 6A–6D. As the carriage is scanned across the page in the forward direction for a first pass, the yellow recording head 52Y is fired in accordance with the driving information for that color (FIG. 6A). The sheet is then incrementally moved in the sheet transport direction A by one pitch or recording segment (e.g. 1/6 inch). On the return pass, both recording heads 52Y and 52M are fired, with the magenta dots overlying the yellow dots of the first pass (FIG. 6B). After the sheet is again incremented by one pitch, the carriage is again moved in the forward direction and recording heads 52Y,52M and 52C are fired (FIG. 6C). Finally, on the second return pass all the heads are fired (FIG. 6D) so that the dots of yellow, magenta, cyan and black will be stratified in accordance with the supplied input data. It can be seen that since four passes are required over a single recording zone to completely "write" that line of information, the multicolor mode is relatively slow.

Figure 7:
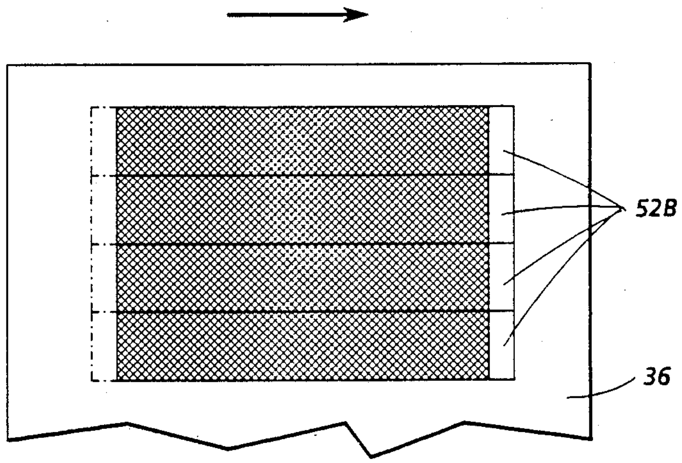
FIG. 7 illustrates the high speed monochrome marking process effected by the FIG. 3 embodiment.

When it is desired to "write" solely in black, all four recording heads may be converted to receive black ink and the four recording zones may be printed simultaneously (as shown in FIG. 7) before the recording sheet is advanced by a like amount. This will allow the printer to operate four times as fast.

When the operator instructs the printer to change its mode of operation from multicolor to black, or vice versa, the following actions are effected: scanning carriage 44 is moved to the maintenance station 60; cap member 62 is coupled with the recording heads 52; diverting valve 84 is repositioned; and the printer controls will energize the suction pump 64 for a predetermined period so as to flush all of the previous color ink from the collecting chamber 80, channels 82 and internal delivery port 94. The volume of ink to be purged will, of course, depend upon the distance of the selector mechanism 14 from the orifice array as well as the sizes of the channel array, the collecting chamber and the port, as well as the type and color of ink. Our experiments with recording heads having a 50 nozzle array have demonstrated that black ink can be changed to yellow ink (the worst case color change situation) by drawing off about 1 cc of ink. A longer flushing cycle should be expected when changing from black to yellow than other color combinations because of the intensity of black/yellow color intermixing, but we are able to completely eliminate all traces of black ink in the yellow printing.

Figure 8:
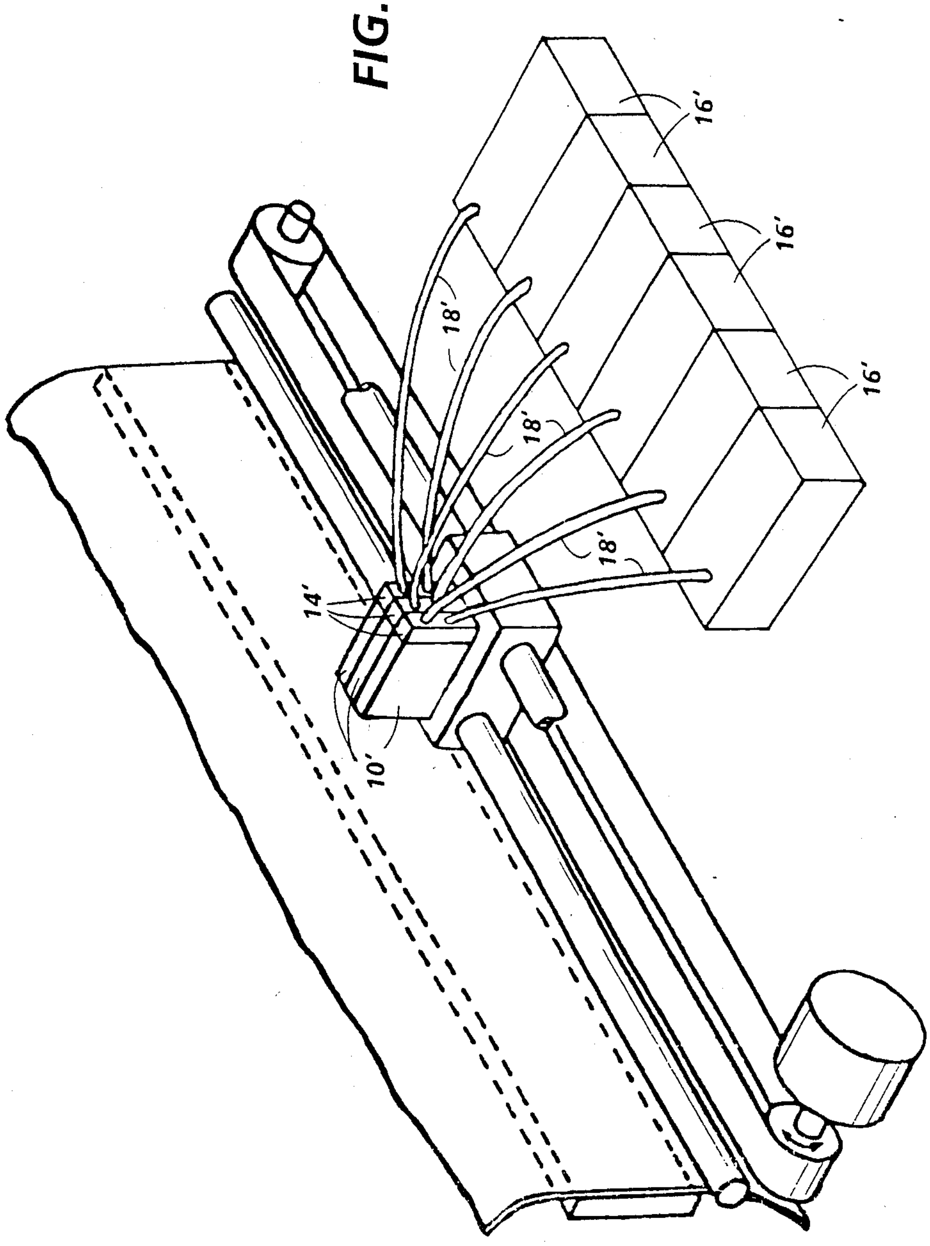
FIG. 8 is a perspective view showing plural horizontally aligned scanning marking heads each having plural color inputs.

In FIG. 8 we show an arrangement for multicolor printing based upon the principles of our invention, wherein like elements are designated by like numbers with a prime (') attached. The horizontally aligned scanning marking heads 10' are connected to ink supply containers 16' via conduits 18'. By judicious control of the selector mechanisms 14', it is possible to access a large spectrum of colors and create multicolor images with a minimum of marking heads.

The ink jet marking device, in any of the forms described above, may be applicable for recording in a printer, a facsimile receiver, a copier, a postal marker, a check endorser, or any other suitable application. It should be understood that the present disclosure has been made only by way of example and that numerous other changes in details of construction and the combination and arrangement of parts may be resorted to without departing from the true spirit and scope of the invention as hereinafter claimed.

What is claimed:

1. An ink jet marking device for marking upon a receptor sheet movable in a transport direction, comprising a plurality of ganged marking heads having arrays of ink ejecting orifices generally aligned in the transport direction and capable of marking in a plurality of colors, a scanning carriage reciprocably movable in a direction normal to the transport direction supports said marking heads, ink reservoir means including a first color ink supply container and plural other color ink ink supply containers, and conduit means for interconnecting said marking heads and said ink supply containers, said device being characterized by one of said marking heads being connected to said first color ink supply container, each of said other marking heads being connected to said first color ink supply container and to one of said other color ink ink supply containers, and diverting means associated with said other marking heads and movable from a first position to a second position for allowing either said first color ink or one of said other color inks to pass to said ink ejecting orifices of said other marking heads.

2. The ink jet marking device as defined in claim 1 further including means for purging each of said other marking heads of the ink and for drawing a different color ink therethrough.

3. The ink jet marking device as defined in claim 2 wherein said means for purging comprises capping means located at one end of said scanning carriage movement, with which said plurality of aligned marking heads may be coupled.

4. The ink jet marking device as defined in claim 2 wherein said means for purging comprises capping means located at one end of said scanning carriage movement, with which said plurality of aligned marking heads may be coupled, and suction means for creating a negative pressure within said capping means.

5. The ink jet marking device as defined in claim 1 wherein said diverting means comprises a valve mounted upon each of said other marking heads.

6. The ink jet marking device as defined in claim 5 wherein each of said diverting valves is individually controllable.

7. The ink jet marking device as defined in claim 5 wherein said diverting valves are ganged together and are simultaneously controllable.

8. The ink jet marking device as defined in claim 1 wherein said marking heads are positioned so that the inter-array orifice spacing in the transport direction is the same as the intra-array orifice spacing in the transport direction.

* * * * *